July 29, 1930.  K. FUJII  1,771,887

THERMOCOUPLE

Filed Feb. 6, 1928

INVENTOR.
Kitaro Fujii
BY
ATTORNEY.

Patented July 29, 1930

1,771,887

UNITED STATES PATENT OFFICE

KITARO FUJII, OF KYOTO-SHI, JAPAN

THERMOCOUPLE

Application filed February 6, 1928. Serial No. 252,415.

This invention relates to improvements in thermocouples, and more particularly to those consisting of a metal and an inorganic matter other than metal coupled together, or of inorganic matters other than metal of different kinds coupled together, and has for its object to provide a thermocouple having a thermoelectric power greater than that of any thermocouple consisting of metals generally in use hitherto adapted for use for a physical and chemical measuring instrument.

In my experiments, I have found that the thermoelectric power of a thermocouple is considerably increased by employing a mineral matter or an inorganic matter in place of a metal generally in use hitherto.

Figure 1:
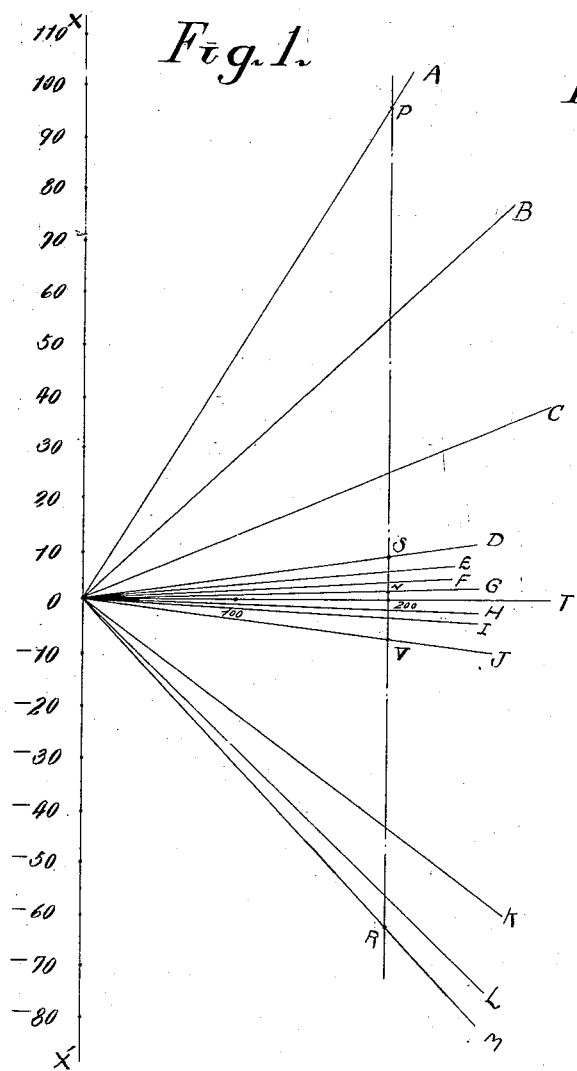
Fig. 1 illustrates a thermoelectric power-temperature diagram for various thermocouples.

In Fig. 1, I graphically illustrate by way of example the results of my various experiments. The temperature difference of a junction of a thermocouple is illustrated along the abscissa OT and the thermoelectric power of platinum in millivolts is taken in the ordinate XOX'. The thermoelectric power for inducing a current in a direction towards the platinum is assumed to have a negative value when below the abscissa. The lines OA, OB, OC, OD, OE, OF, OG, OH, OI, OJ, OK, OL and OM represent the thermoelectric power-temperature curves for couple of platinum and lead sulphide or galena, arsenical ferrous sulphide or arsenical pyrite, ferrous sulphide or iron pyrite, bismuth, nickel, palladium, copper, silver, iron, antimony, cupric sulphide or azurite, marcacite, cuprous sulphide or chalcocite respectively, in which the thermoelectric powers induced in various thermocouples by temperature difference at their junctions will clearly be seen. For example, the thermoelectric power for a thermocouple of metals at a temperature difference of 200° C. is maximum with a bismuth-antimony couple, but it is not more than SV, whilst the thermoelectric powers for the couples of galena-platinum and chalcocite-platinum under the same condition increase so far as correspond to PN and RN respectively, and further the thermoelectric power of a thermocouple of galena-chalcocite increases so far as corresponds to PR.

Based in the above-mentioned experiments, the invention is designed to employ mineral matter or inorganic matter of an electric conductive character besides metal for an element or elements of a thermocouple to provide a very sensitive measuring instrument for physical and chemical purposes.

Figure 2:
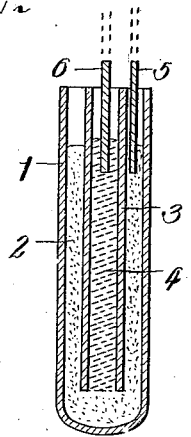
Fig. 2 illustrates an embodiment of my invention in longitudinal section.

I show an embodiment of the invention in Fig. 2 by way of example. In Fig. 2, 1 represents a quartz-glass tube with a closed end and is filled with galena 2 therein. 3 represents another smaller quartz-glass tube with open ends and is filled with chalcocite 4 therein and is embedded in the galena contained in the quartz-glass tube 1. In the galena 2 and chalcocite 4 are embedded platinum wires 5 and 6 respectively.

While I have illustrated my invention in Fig. 2, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claim.

Having now particularly described and ascertained the nature of my said invention and in what manner the same is to be performed, I declare that what I claim is:—

A thermocouple comprising a quartz-glass tube closed at one end, another quartz-glass tube of smaller size with open ends placed in the first mentioned tube, mineral matter fused in the interspace between said both tubes, other mineral matter different from the first mentioned matter fused in the smaller tube and platinum wire pieces embedded in said matters for connection of both, as described, the said mineral matters contacting with each other.

In testimony whereof I have signed my name to this specification.

KITARO FUJII.